Nov. 8, 1927.
J. L. PRICE
BRAKE
Filed March 22, 1926
1,648,362
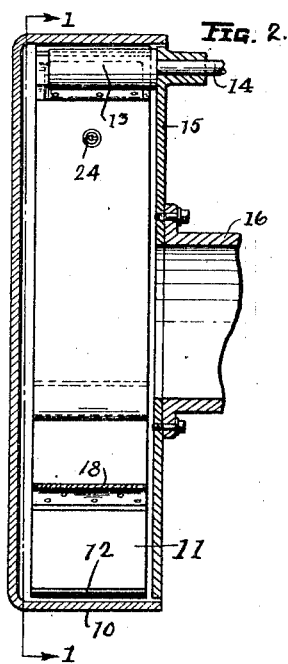
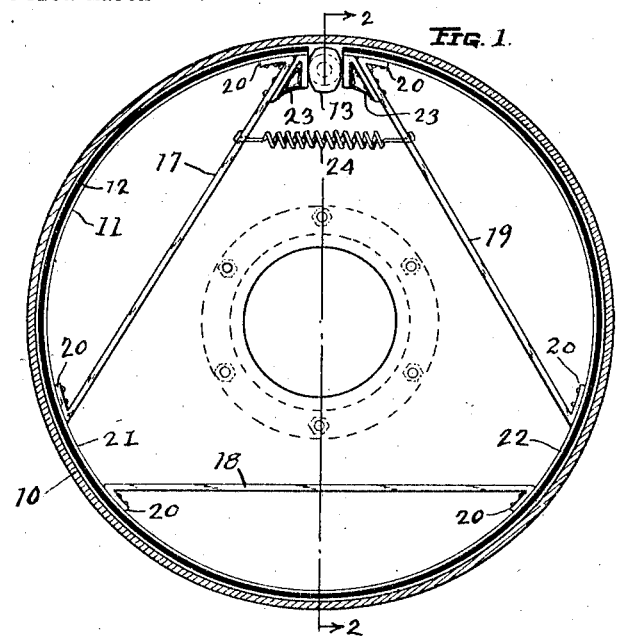
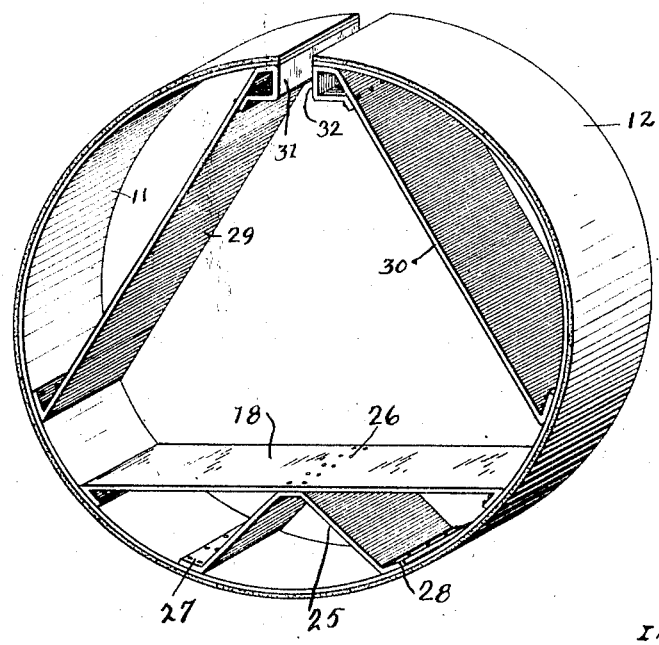
INVENTOR.
JACOB L. PRICE.
Kwis Hudson & Kent
ATTORNEYS.

Patented Nov. 8, 1927.

1,648,362

UNITED STATES PATENT OFFICE.

JACOB L. PRICE, OF SOUTH BEND, INDIANA, ASSIGNOR TO VINCENT BENDIX, OF CHICAGO, ILLINOIS.

BRAKE.

Application filed March 22, 1926. Serial No. 96,376.

This invention relates to brakes for motor vehicles and more particularly to an improved form of internal brake band that is adapted to cooperate with the interior of a brake drum.

It is one of the objects of the invention to provide an internal brake band of extremely simple construction that may be manufactured at a minimum cost and will, nevertheless, be efficient in operation and possess certain other advantages over prior constructions.

It is a further object of the invention to provide an internally expanding brake band that will be so reinforced as to form the band into a plurality of brake units that will be inherently flexible and also connected together by flexible sections of the band so that these several brake units may adapt themselves to the brake drum in which the band is installed, and will also be controllable, in their application to the brake drum, and thus prevent the "grabbing" action which internally expanding brake bands are usually found to possess.

Other objects of the invention and the features of novelty will be apparent from the following description taken in connection with the accompanying drawings, of which:

Fig. 1 is a side elevation of a brake embodying my invention, the brake drum being shown in section on the line 1—1 of Fig. 2;

Fig. 2 is a section on the line 2—2 of Fig. 1; and

Fig. 3 is a perspective view of a form of band, embodying my invention, but slightly different from the construction illustrated in Figs. 1 and 2.

Referring to the drawings, 10 indicates the usual brake drum within which there is arranged a flexible band 11 having the usual lining material 12 on its outer surface. The usual actuating cam is shown at 13, this cam being mounted on a shaft 14 that is carried by the dust shield 15 on the end of the axle housing 16. While I have shown the cam 13 for actuating the brake, it is to be understood that any of the usual forms of actuating device, for internally expanding brakes, may be employed.

I arrange across the interior of the band a plurality of struts or braces which connect spaced portions of the band together and, in the two forms of the invention illustrated, I have shown three of these struts, the same being indicated, in Fig. 1, by the numerals 17, 18 and 19. In the arrangement of these struts, they constitute chords of the circle of the band and the ends of the struts are provided with feet 20, which are riveted or otherwise secured to the interior of the band. The adjacent ends of the struts 17 and 18 are spaced apart to leave a flexible portion of the band, as indicated at 21, therebetween and there is a similar flexible portion of the band, 22, between the adjacent ends of the struts 18 and 19. Brackets 23 may be secured to the struts 17 and 19, these brackets having surfaces with which the cam 13 cooperates for the purpose of expanding the band. A spring 24 may connect the struts 17 and 19 for the purpose of retracting the band, when the brake is released.

Each of the struts or braces 17, 18 and 19, with the portion of the band that is spanned thereby, constitutes a substantially rigid brake unit of which the band portion is relatively flexible, so as to conform to the inner surface of the brake drum. The several brake units, on account of being connected together by the flexible portions of the band, 21 and 22, are separately controllable and the brake, as a whole, will be free from the "grabbing" action that is usually inherent in internally expanding band brakes, since the struts 17, 18 and 19 will directly transmit actuating forces, so that the band itself, throughout its entire length, is not depended upon to transmit these forces. The struts also serve to hold the parts of the band that are connected thereby in a definite relation, at all times.

In the form of the invention illustrated in Fig. 3, the strut or brace 18 is further connected with the portion of the band, between the ends thereof, by the V-shaped brace 25 which has its middle portion riveted or otherwise secured to the strut 18, as indicated at 26, and its ends secured to the portion of the band, between the ends of the strut 18, as indicated at 27 and 28. This has the effect of making the brake unit, as a whole, a more nearly rigid structure because of its truss-like construction, although it has sufficient flexibility to conform to the brake drum. A further modification, that is illustrated in Fig. 3 is the bending of the ends of the struts 29 and 30 to form the abutments 31 and 32 which cooperate with the actuating cam, this arrangement making it unnecessary to use the separate brackets 23, shown in Fig. 1.

Having thus described my invention, I claim:

1. In brakes, an expansible band having a plurality of struts secured to the interior thereof and rigidly connecting spaced points on the band together, the portions of the band between the ends of said struts being relatively flexible.

2. In brakes, an expansible band having a plurality of struts secured to the interior thereof and rigidly connecting spaced points on the band together, the portions of the band between the ends of said struts being flexible, and the ends of the different struts which are remote from the ends of the band being spaced apart to leave flexible portions of the band therebetween.

3. In brakes, an expansible band having means secured on the interior thereof and dividing the band into a plurality of relatively separate brake members, the ends of said members being rigidly connected by said means, and the portions of the band included in each of said members being flexible.

4. In brakes, an expansible band having means secured on the interior thereof and dividing the band into a plurality of relatively separate brake members, the ends of the said members which are remote from the ends of the band being spaced apart and connected together by flexible portions of the band.

5. In brakes, an expansible band having struts secured at one end to the opposite ends of the band and extending in diverging relation across the interior thereof and secured at their opposite ends to intermediate portions of the band, and the portions of the band between the ends of the respective struts being flexible.

6. In brakes, an expansible band having struts secured at one end to the opposite ends of the band and extending in diverging relation across the interior thereof and secured at their opposite ends to intermediate portions of the band, the portions of the band between the ends of the respective struts being flexible, and another strut having its ends secured to the band on opposite sides of the middle portion of the band.

7. In brakes, an expansible band having struts secured at one end to the opposite ends of the band and extending in diverging relation across the interior thereof and secured at their opposite ends to intermediate portions of the band, and the portions of the band between the ends of the respective struts being flexible, and the ends of the struts which are attached to the ends of the band being provided with abutments for co-operation with an actuating means for the brake.

8. In brakes, an expansible band having a strut of the same width as the band extending across the interior and attached at its ends to the band, the portion of the band that is spanned by said strut being relatively flexible.

9. In brakes, an expansible band having a strut extending across the interior and attached at its ends to the band, the portion of the band that is spanned by said strut being flexible, and means connecting an intermediate portion of said strut with the portion of the band that is spanned by the strut.

10. In brakes, an expansible band having a strut extending across the interior and attached at its ends to the band, the portion of the band that is spanned by said strut being inherently flexible, and means connecting an intermediate portion of said strut with a plurality of points on the portion of the band that is spanned by the strut.

In testimony whereof, I hereunto affix my signature.

JACOB L. PRICE.